Jan. 4, 1927.
C. UEBELMESSER
1,613,418
LIQUID LEVEL INDICATOR
Filed Feb. 10, 1925
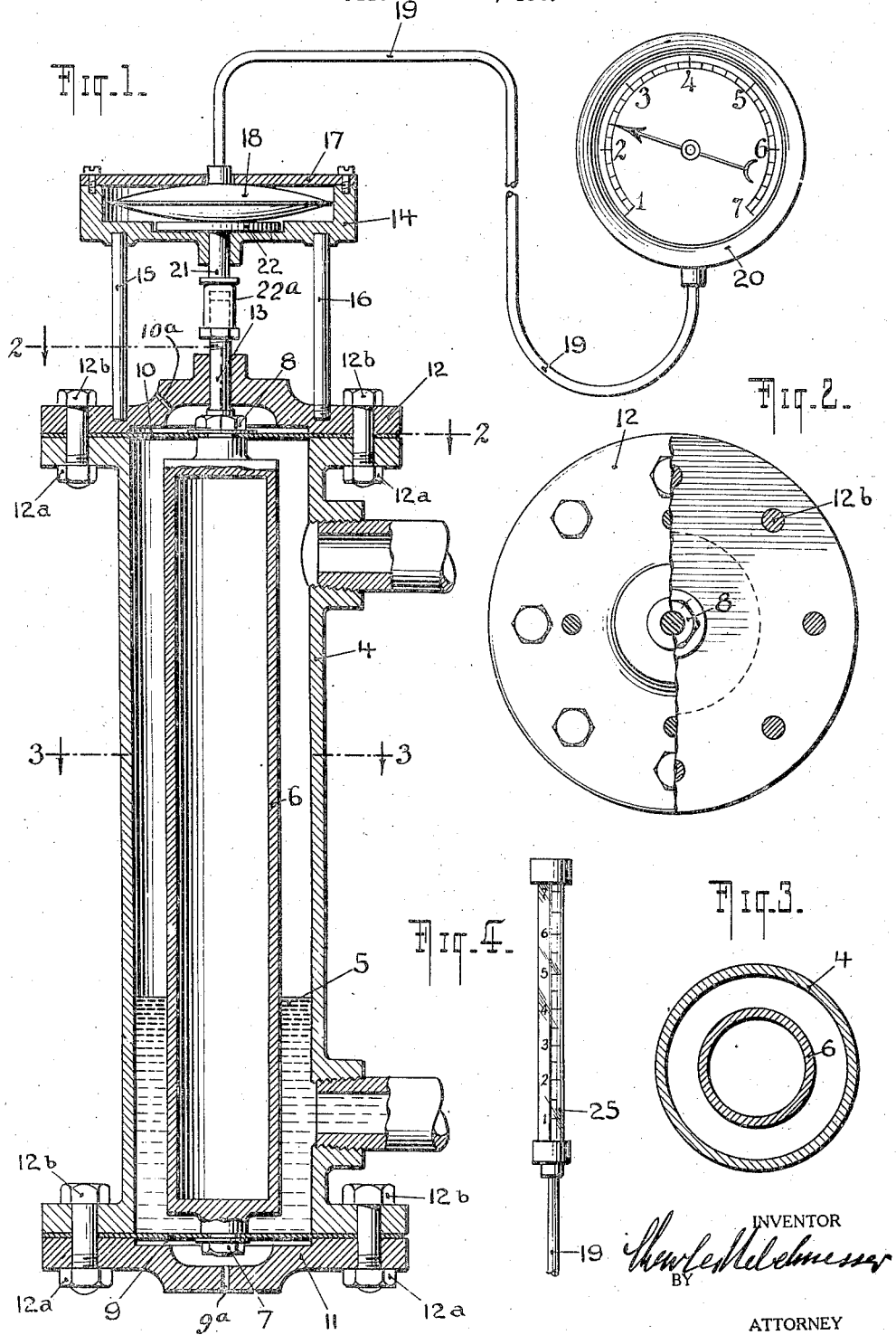

UNITED STATES PATENT OFFICE.

CHARLES UEBELMESSER, OF NEW YORK, N. Y.

LIQUID-LEVEL INDICATOR.

Application filed February 10, 1925. Serial No. 8,119.

My improvements are designed to provide an effective device for use in connection with liquid containers, such as steam boilers, oil tanks, etc., that will positively and visually indicate the liquid level therein by extraneous means substantially as hereinafter set forth—the invention consisting in the specific combination and arrangement of component parts described and claimed.

In the accompanying drawings:

Fig. 1, represents essentially a central vertical section of the device as used in conjunction with a pressure gauge;

Fig. 2, is a transverse section taken on line 2—2, of Fig. 1;

Fig. 3, is a transverse section taken on line 3—3, of Fig. 1; and

Fig. 4, a detail view of a glass gauge that may be substituted in lieu of the pressure gauge shown in Fig. 1.

The cylindrical receptacle 4, is connected with a liquid container by conduits positioned above and below the medial water level, and is sealed at the top by the diaphragm 10, and at the bottom by the diaphragm 9, both of which diaphragms are flexible, the top diaphragm 10, being secured to the receptacle 4, by the cap plate 12, and the bottom diaphragm to said receptacle 4, by the base plate 11, screw bolts $12^b$, and nuts $12^a$, being used for the purpose, as shown in Fig. 1.

6, is a hermetically sealed cylindrical float mounted upon and between the diaphragms 9 and 10, by means of nuts 7 and 8, engaging with screw studs formed for the purpose on the extremities of said float 6, the upper screw stud being prolonged in the form of a stem 13, which extends through the cap plate 12, said stem 13, being integral with the float 6.

Mounted upon standard supports 15 and 16, rigidly attached to the cap plate 12, is a casing 14, in which a pressure bellows 18, is located, said casing 14, being provided with a cover 17, which functions as a bearing for the upper side of the bellows 18, the lower side of which rests against a contact disc 22, integral with the upper extremity of the supplementary stem 21, which latter extends through the bottom of the casing 14, in alignment with the float stem 13, to which it is coupled by a sleeve $22^a$ on the lower extremity of said supplementary stem 21, as shown in Fig. 1.

The bellows 18 is connected by a pipe 19, either with a pressure gauge 20, as illustrated in Fig. 1, or with a fluid indicator glass 25, shown in Fig. 4, or with equivalent means for indicating the degree of pressure within the transmitting bellows 18, in a manner well known in the art.

Obviously the degree of pressure within and exerted by the bellows 18, will depend upon the quantity and level of the liquid 5, in the cylindrical receptacle 4, as transmitted and controlled by and through the medium of the float 6, the stem 13, of the latter contacting with the supplementary stem 21 when the float 6, is raised sufficiently to transmit the movement through its contact disc 22, to the bellows 18, thereby compressing said bellows,—it being understood of course, that the diaphragms 9 and 10 yield sufficiently for the purpose. $9^a$ is a vent from the space beneath the diaphragm 9, and $10^a$ is a vent from the space above the diaphragm 10.

What I claim as my invention and desire to secure by Letters Patent, is:—

A liquid level indicator of the character designated, comprising a receptacle open at its ends, conduits connecting the same with a liquid container above and below the medial water level, flexible diaphragms, means holding the diaphragms to the ends of the receptacle, a hermetically sealed float, means for causing said float to move with the diaphragms, a protuberant stem connected at one end to one of said diaphragms, a pressure bellows contacting the other end of said stem, a housing for the said bellows, said housing being connected to the receptacle, a pressure gauge, and tubular means connecting the pressure gauge and bellows, said pressure gauge being controlled by said pressure bellows.

CHARLES UEBELMESSER.